(No Model.)
C. J. WHIPPLE.
SAFETY BICYCLE STAND.
No. 498,598. Patented May 30, 1893.
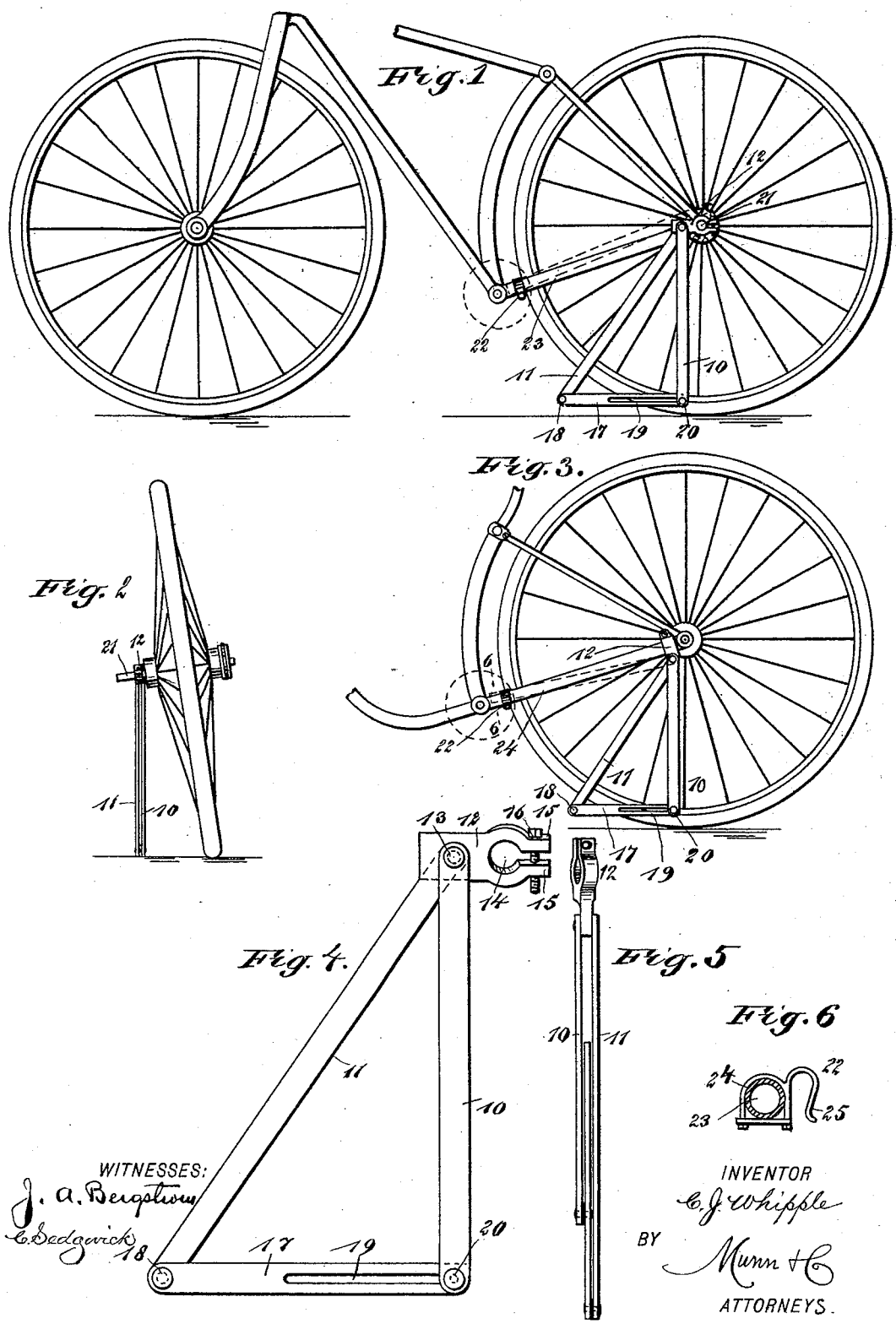
WITNESSES:
J. A. Bergstrom
C. Sedgwick
INVENTOR
C. J. Whipple
BY
Munn & Co
ATTORNEYS.
THE NORRIS PETERS CO., PHOTO-LITHO., WASHINGTON, D. C.

UNITED STATES PATENT OFFICE.

CLAYTON J. WHIPPLE, OF WATERLOO, IOWA.

SAFETY-BICYCLE STAND.

SPECIFICATION forming part of Letters Patent No. 498,598, dated May 30, 1893.

Application filed July 30, 1892. Serial No. 441,660. (No model.)

*To all whom it may concern:*

Be it known that I, CLAYTON J. WHIPPLE, of Waterloo, in the county of Black Hawk and State of Iowa, have invented a new and Improved Safety-Bicycle Stand, of which the following is a full, clear, and exact description.

My invention relates to improvements in bicycle stands, and the object of my invention is to produce an extremely simple, cheap and convenient stand which is especially adapted for use in connection with safety bicycles, which may be easily applied to any bicycle so as to be carried about without interfering with its operation, which may be dropped into a position to sustain the bicycle so that the rider will not need to hunt around after a fence post or other object against which the bicycle may be leaned to support it, and which, when the bicycle is in use, may be folded into a very small compass and held securely so as to be in no danger of interfering with the movements of the bicycle.

To this end my invention consists in a bicycle stand the construction of which will be hereinafter described and claimed.

Reference is to be had to the accompanying drawings forming a part of this specification, in which similar figures of reference indicate corresponding parts in all the views.

Figure 1 is a broken side elevation of a man's bicycle provided with my improved stand, the stand being shown in open position. Fig. 2 is a rear elevation of the same. Fig. 3 is a broken side elevation showing the application of the stand to a woman's bicycle. Fig. 4 is an enlarged detail side elevation of the stand in open position. Fig. 5 is an edge view of the same in collapsed position; and Fig. 6 is a cross section on the line 6—6 in Fig. 3, showing the construction of the fastening device which holds the stand in a raised position.

The stand is provided with two swinging side pieces 10 and 11, the latter being longer than the former, and these, at their upper ends, carry a clamp 12 which is pivoted between the ends of the side pieces, as shown at 13. The clamp has a socket 14 to receive the axle or step of the rear wheel of the bicycle or to receive the side bar of the frame, as the case may be, and this socket has an open side, the opening being between parallel lips 15, which are held together by a clamping screw or bolt 16, so that when the clamp is applied to an axle or frame, the opposite sides of the socket may be fastened securely in place so as to prevent the accidental displacement of the stand.

The base of the stand consists of a flat rod 17, which at one end is pivoted to the lower extremity of the side piece 11, as shown at 18 and which, near its opposite end, is slotted longitudinally as shown at 19, the slot receiving a pivot pin 20 at the lower extremity of the side piece 10 and this construction enables the two side pieces to be folded into a parallel position, and when this is done, the slotted base piece 17 will slide upward on the pivot pin 20, and the said base itself will be held between the two side pieces, as shown in Fig. 5. When, however, the stand is in open position, as shown in Fig. 4, it will assume a triangular shape which will give it great strength in proportion to the heft of the material of which it is made.

When applied to a man's bicycle, as shown in Figs. 1 and 2, the clamp is secured to the axle 21 of the rear wheel on the side opposite the driving sprocket and when the stand is collapsed it may be swung up into a position parallel with the side bar 23 of the frame, as shown by dotted lines in Fig. 1, where it is retained by a fastening device 22. Any suitable fastening device may be used to hold the stand in this position, and a simple form is shown in Fig. 6, which consists of a clip 24 adapted to be clamped upon the side bar 23, and a spring catch 25 held on one side of the clip and having on its under side an open mouth arranged in the path of the stand.

When the stand is released from the catch and dropped down into the position shown in Figs. 1 and 2, it will open of itself and the bicycle may be leaned slightly so as to rest upon the stand, which will prevent it from falling over. When the stand is to be collapsed, the shorter side piece 10 is simply pushed forward and this causes the rear end of the base piece 17 to be raised, and as the base piece slides in relation to the side piece 10, the three parts 10, 11 and 17 of the stand will come into a parallel position and they may be easily secured in the manner described.

For a woman's bicycle, the clamp 12 is preferably applied to the side bar 23 of the frame adjacent to the rear axle, as it is not convenient to secure the clamp to the axle. In this case, the clamp 12 is made of slightly different shape so that the side pieces 10 and 11, may swing at an angle to it as shown in Fig. 3, instead of swinging parallel with the whole body of the clamp.

Having thus fully described my invention, I claim as new and desire to secure by Letters Patent—

1. A portable bicycle stand, comprising a clamp or attaching device, and a triangular support pivoted thereto and formed of three pivotally connected members, the base member having a sliding connection with one of the side members, whereby the three members may be folded parallel with each other, substantially as set forth.

2. A bicycle stand comprising a clamp, side pieces pivoted to the clamp, and a slotted base piece connecting the free ends of the side pieces and held to slide on one of its pivot pins, substantially as described.

3. A bicycle stand comprising a clamp having a socket therein, and a clamping bolt to compress the socket, side pieces pivoted on opposite sides of the clamp, and a slotted base piece connecting the free ends of the side pieces and held to slide on one of its securing pins, substantially as described.

CLAYTON J. WHIPPLE.

Witnesses:
OSCAR W. TORRENCE,
CARRIE SAHM.